United States Patent
Lowe et al.

(10) Patent No.: US 7,415,727 B1
(45) Date of Patent: Aug. 19, 2008

(54) SYSTEM, METHOD, AND COMPUTER PROGRAM PRODUCT FOR TAILORING SECURITY RESPONSES FOR LOCAL AND REMOTE FILE OPEN REQUESTS

(75) Inventors: Joseph C. Lowe, Aloha, OR (US); Jonathan L. Edwards, Portland, OR (US); Srin N. Kumar, Sunnyvale, CA (US)

(73) Assignee: McAfee, Inc., Santa Clara, CA (US)

( * ) Notice: Subject to any disclaimer, the term of this patent is extended or adjusted under 35 U.S.C. 154(b) by 520 days.

(21) Appl. No.: 10/876,523

(22) Filed: Jun. 24, 2004

(51) Int. Cl.
*G06F 11/30* (2006.01)
*G06F 12/14* (2006.01)

(52) U.S. Cl. .......................... 726/24; 713/189; 711/100

(58) Field of Classification Search .................. 726/24; 713/188
See application file for complete search history.

(56) References Cited

U.S. PATENT DOCUMENTS

| | | | | |
|---|---|---|---|---|
| 5,889,943 | A | 3/1999 | Ji et al. | 395/187.01 |
| 5,956,481 | A * | 9/1999 | Walsh et al. | 726/23 |
| 5,964,889 | A | 10/1999 | Nachenberg | 714/25 |
| 6,266,707 | B1 | 7/2001 | Boden et al. | 709/245 |
| 6,460,050 | B1 | 10/2002 | Pace et al. | 707/104.1 |
| 6,473,896 | B1 | 10/2002 | Hicken et al. | 717/132 |
| 6,594,686 | B1 * | 7/2003 | Edwards et al. | 709/203 |
| 6,611,925 | B1 | 8/2003 | Spear | 714/38 |
| 6,779,118 | B1 | 8/2004 | Ikudome et al. | 713/201 |
| 6,928,555 | B1 * | 8/2005 | Drew | 713/188 |
| 6,973,578 | B1 * | 12/2005 | McIchione | 713/188 |
| 7,216,367 | B2 * | 5/2007 | Szor | 726/25 |
| 2003/0023875 | A1 | 1/2003 | Hursey et al. | 713/201 |
| 2003/0065926 | A1 | 4/2003 | Schultz et al. | 713/188 |
| 2004/0168070 | A1 * | 8/2004 | Szor | 713/188 |
| 2005/0166001 | A1 * | 7/2005 | Conover et al. | 711/100 |

FOREIGN PATENT DOCUMENTS

EP 1 357 499 10/2003

OTHER PUBLICATIONS

Mark Russinovich. Windows NT System Management: A collection of topics. Jun. 1998 29 Street Press. p. 1-6.*
Office Action Summary from U.S. Appl. No. 10/876,524 which was mailed on Sep. 8, 2005.
Related U.S. Appl. No. 10/876,524, filed Jun. 24, 2004.
Office Action from U.S. Appl. No. 10/876,524 that was mailed on May 10, 2005.
Office Action Summary from U.S. Appl. No. 10/876,524 which was mailed on Feb. 14, 2007.

* cited by examiner

*Primary Examiner*—Christian LaForgia
(74) *Attorney, Agent, or Firm*—Zilka-Kotab, PC; Christopher J. Hamaty

(57) ABSTRACT

A security system, method and computer program product are provided. In use, a request is received to open a file on a local computer. Thereafter, it is determined whether the request is received from a local process operating on a local computer or from a remote computer, so that such determination may be used for security purposes.

19 Claims, 4 Drawing Sheets

SYSTEM, METHOD, AND COMPUTER PROGRAM PRODUCT FOR TAILORING SECURITY RESPONSES FOR LOCAL AND REMOTE FILE OPEN REQUESTS

RELATED APPLICATION(S)

The present application is related to application Ser. No. 10/876,524 entitled "RULE SET-BASED SYSTEM AND METHOD FOR ADVANCED VIRUS PROTECTION" which was filed coincidentally herewith on Jun. 24, 2004, and which is incorporated herein by reference.

FIELD OF THE INVENTION

The present invention relates to network security, and more particularly to preventing viruses from infecting computers.

BACKGROUND OF THE INVENTION

In the space of just a few years, the Internet, because it provides access to information, and the ability to publish information, in revolutionary ways, has emerged from relative obscurity to international prominence. Whereas, in general, an internet is a network of networks, the Internet is a global collection of interconnected local, mid-level, and wide-area networks that use the Internet Protocol (IP) as the network layer protocol. Whereas the Internet embraces many local- and wide-area networks, a given local- or wide-area network may or may not form part of the Internet.

As the Internet and its underlying technologies have become increasingly familiar, attention has become focused on Internet security and computer network security in general. With unprecedented access to information has also come unprecedented opportunities to gain unauthorized access to data, change data, destroy data, make unauthorized use of computer resources, interfere with the intended use of computer resources, etc. As experience has shown, the frontier of cyberspace has its share of scofflaws, resulting in increased efforts to protect the data, resources, and reputations of those embracing intranets and the Internet.

To this end, security experts are constantly inventing new ways of enhancing computer network security. For example, it is known that the name of the application process that accesses a file can be very important in determining whether the access is likely to be 'safe' or 'dangerous.'

For example, previous scanners introduced the concept of 'Per Process Configuration'. This feature allows a virus scanner to use different scanning options depending on the process that accesses a file. For example, if a file is being opened by MS Word®, it is important to scan the file for macro viruses since MS Word® will execute the macros when it opens the file. However, if the file is being opened by a backup program, it may not be necessary to scan for macro viruses because they will not be executed.

One limitation of Windows NT® is that when a file is opened by a computer on the network, the file is opened on the local system by the operating system kernel. It is therefore impossible to distinguish between files being opened by the kernel for its own use and files being opened by the kernel on behalf of computers over the network. See, for example, the prior art operation shown in Table 1.

TABLE 1

| 1. | PC1 sends message to PC2 to open \\PC2\SHARE\file.exe |
| 2. | PC2 receives message. Drivers in the kernel translate \SHARE\file.exe to c:\shared\file.exe |
| 3. | Drivers in kernel of PC2 open c:\shared\file.exe |

Prior art virus scanners assign all opens by the kernel to a process called 'System.' The kernel opens files for its own use (these tend to be safe operations). It also opens files for remote computers (these are suspicious operations because remote computers cannot necessarily be trusted). Unfortunately, prior art virus scanners do not know the difference because they all came from the kernel (process 'System').

There is thus a need for overcoming these and other related security problems.

SUMMARY OF THE INVENTION

A security system, method and computer program product are provided for discerning between local and remote open file requests for security purposes. In use, a request is received to open a file on a local computer. Thereafter, it is determined whether the request is received from a local process operating on a local computer or from a remote computer, so that such determination may be used for security purposes.

In one embodiment, a kernel component of the local computer may handle the request if it is received from the remote computer via a network. Thus, in such embodiment, the determination may be carried out utilizing the kernel component. Such kernel component may optionally include a srv.sys file.

As an option, the kernel component may create a plurality of threads to process a plurality of the requests received from a plurality of the remote computers via a network. In use, one of the threads associated with one of the requests may be identified utilizing a virus scanner. To this end, the virus scanner may obtain a start address of code associated with the identified thread, whereby the virus scanner determines whether the start address is within the kernel component.

If it is determined that the start address is within the kernel component, the associated request may be categorized as a request received via the network. Further, if it is determined that the start address is not within the kernel component, the associated request may be categorized as a request received locally.

Thus, the requests received via the network may be handled with more scrutiny with respect to the requests received locally. For example, the requests received via the network may be handled utilizing a first process associated with the virus scanner. Moreover, the requests received locally may be handled utilizing a second process associated with the virus scanner. Therefore, the requests may be handled based on the determination for tailoring the handling in accordance with the type of the requests.

For example, access to the file may be conditionally given based on the determination. Further, scanning may optionally be tailored based on the determination.

DETAILED DESCRIPTION

Figure 1:
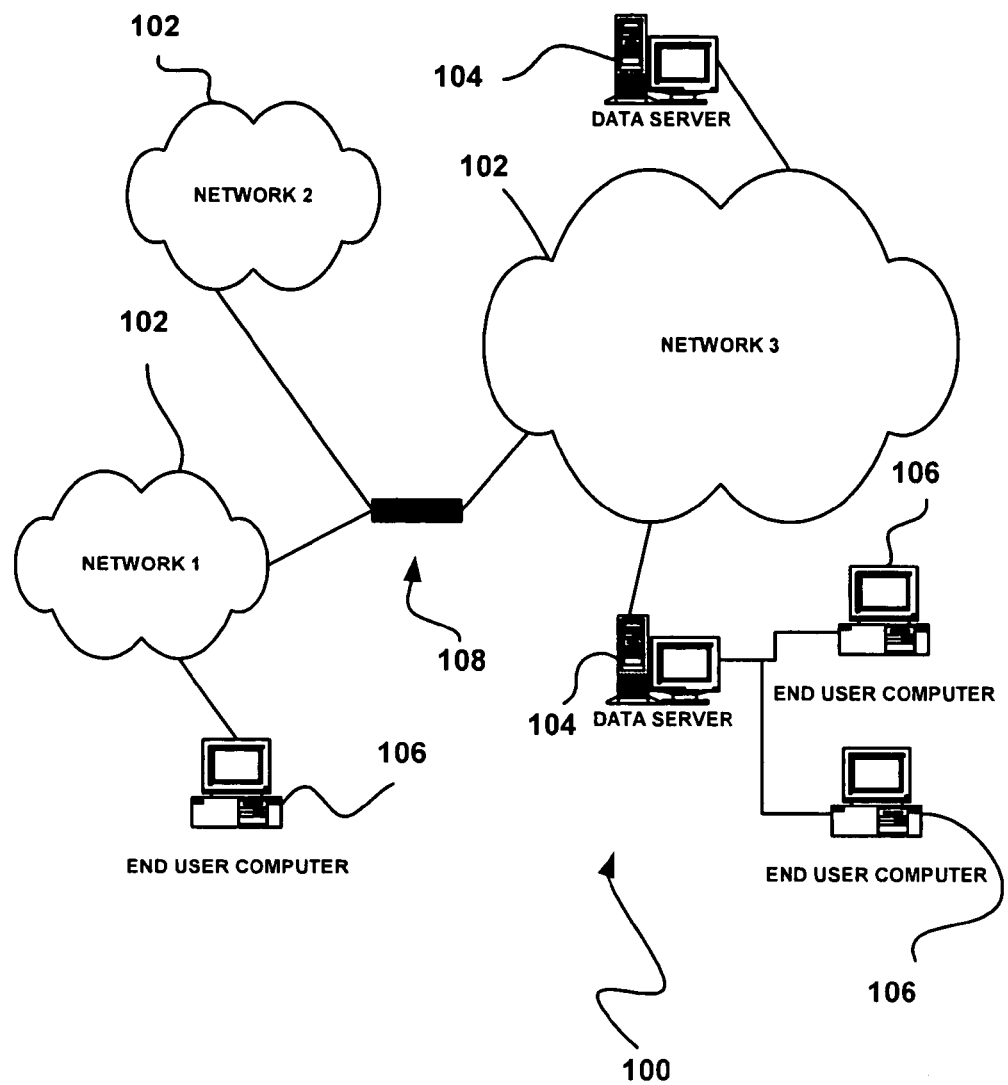
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway or router 108 is optionally coupled therebetween.

It should be noted that each of the foregoing network devices in the present network architecture 100, as well as any other unillustrated hardware and/or software, may be equipped with various security features. For example, the various data server computers 104 and/or end user computers 106 may be equipped with security functionality in the form of a virus scanner, a firewall, etc. for purposes that will be set forth hereinafter in greater detail.

In use, the aforementioned security functionality is adapted for discerning between local and remote open file requests for security purposes. In use, a request is received to open a file on a local computer (i.e. one or more of the data server computers 104 and/or end user computers 106, etc.). Thereafter, it is determined whether the request is received from a local process operating on the local computer or from a remote computer (i.e. one or more of the data server computers 104 and/or end user computers 106, etc.), so that such determination may be used for security purposes.

To this end, malware infection is inhibited, at least in part. More information regarding optional functionality and architectural features will now be set forth for illustrative purposes.

Figure 2:
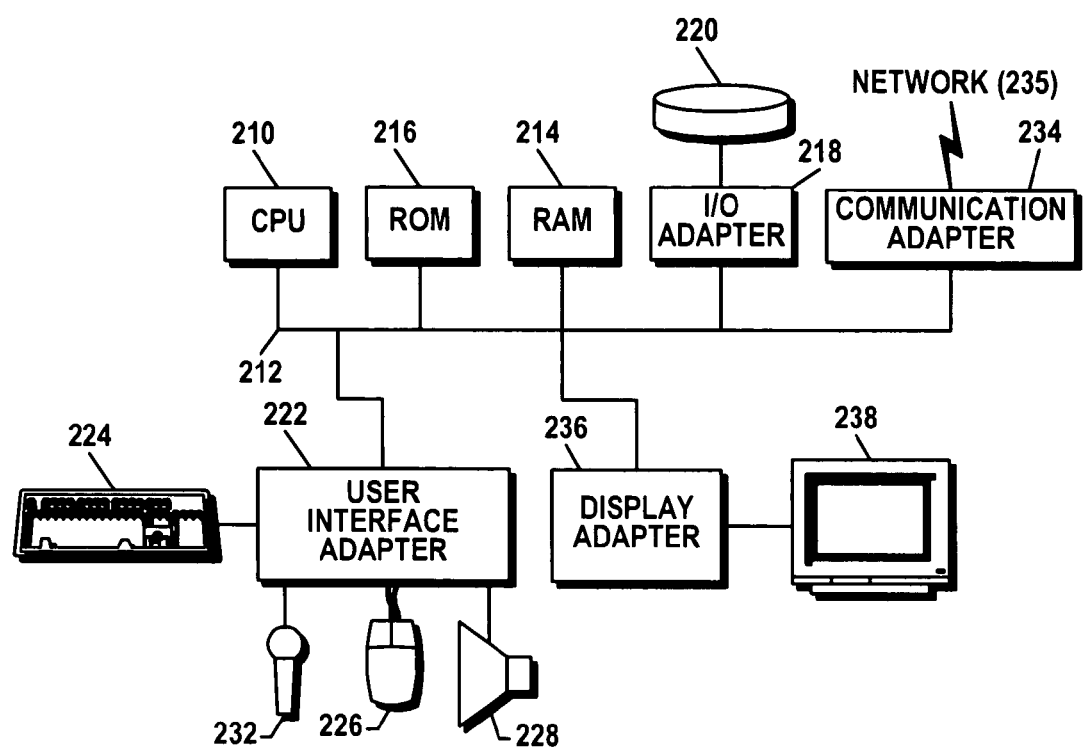
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA™, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
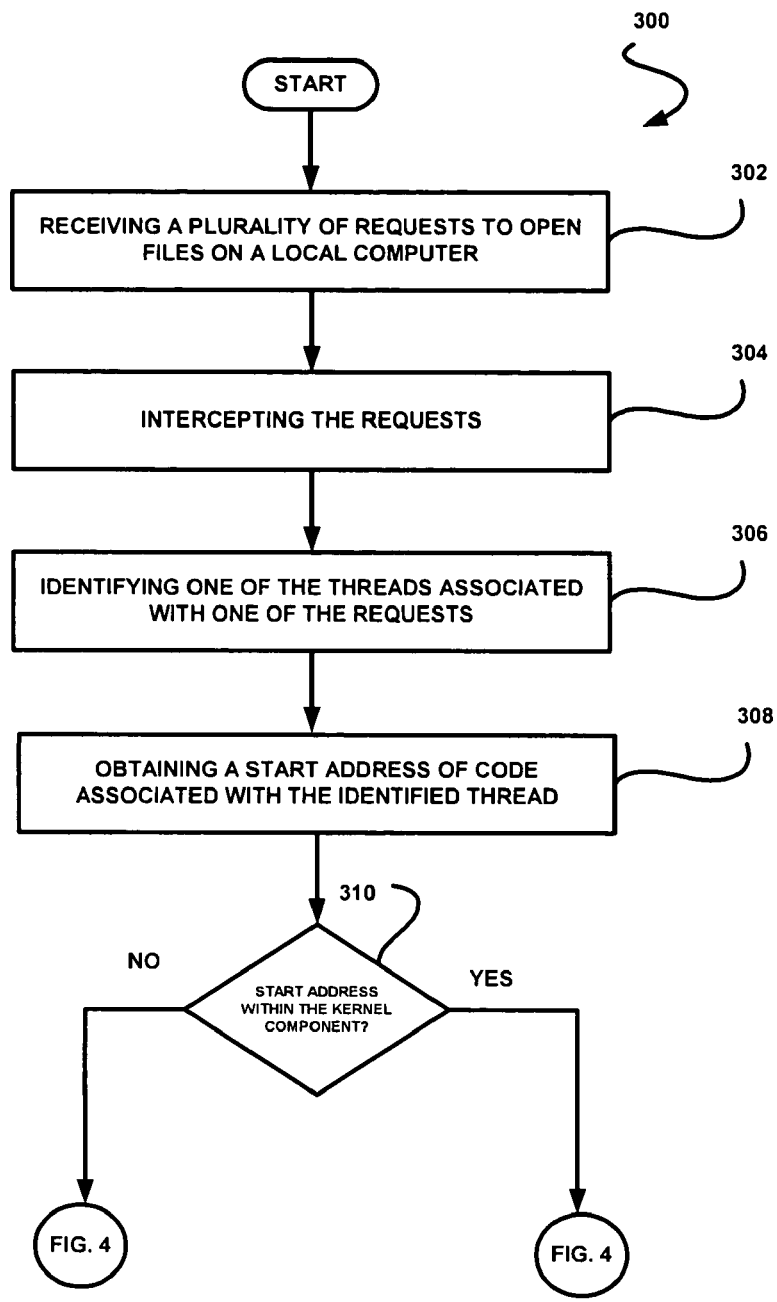
FIG. 3 illustrates a method for discerning between local and remote open file requests for security purposes, in accordance with one embodiment.
Figure 4:
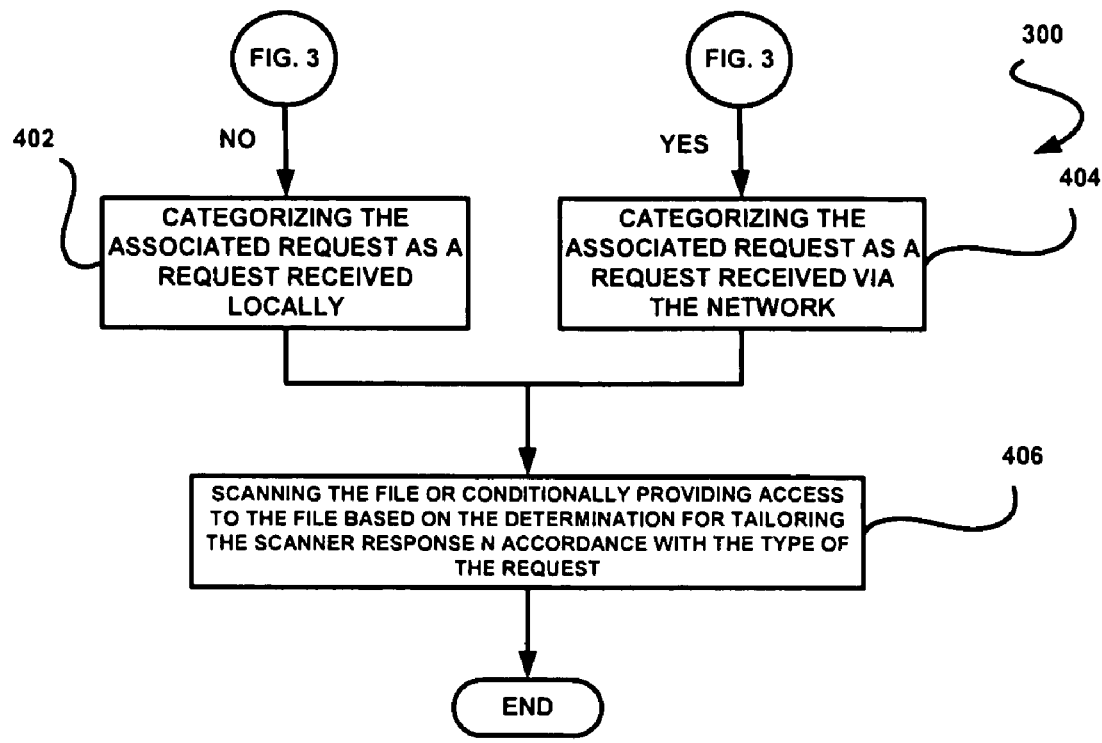
FIG. 4 illustrates a continuation of the method of FIG. 3 for discerning between local and remote open file requests for security purposes.

FIGS. 3 and 4 illustrate a method 300 for discerning between local and remote open file requests for security purposes, in accordance with one embodiment. As an option, the present method 300 may be implemented in the context of the architecture and environment of FIGS. 1 and/or 2. Of course, however, the method 300 may be carried out in any desired environment.

In one embodiment, the various operations to be set forth may be carried out utilizing a virus scanner associated with the local computer. Of course, any other related security module may further be relied upon for carrying out the functionality set forth herein, per the desires of the user.

In use, a plurality of requests to open files on a local computer are received, as indicated in operation 302. In the context of the present description, such local computer may, for example, include one or more of the data server computers 104, the end user computers 106, and/or another local computer, etc.

In one embodiment, the aforementioned requests to open the files may include any attempts to open, modify, etc. any sort of data existing on the local computer. It should be noted that the requests received via a network may be handled differently than those received locally. Specifically, the requests received via a network may be handled by a kernel component which creates a plurality of threads to process the requests received from the network.

In the present description, a kernel (i.e. any comparable component of an operating system) may optionally (but need not necessarily) include an interrupt handler that handles requests or completed I/O operations that compete for the kernel services, a scheduler that determines which programs share the kernel processing time in what order, and/or a supervisor that actually gives use of the computer to each process when it is scheduled. A kernel may also optionally include a manager of the operating system address spaces in memory or storage, sharing these among all components and other users of the kernel services. Kernel services are sometimes requested by other parts of the operating system or by application programs through a specified set of program interfaces sometimes known as system calls.

In one embodiment, the kernel component disclosed herein may include a srv.sys file. Of course, any kernel component may be employed.

As will soon become apparent, such kernel component and related functionality may be employed to discern between local and remote open file requests for security purposes. It should be understood, however, that any desired technique for discerning between local and remote open file requests may be employed, per the desires of the user.

Next, in operation 304, the aforementioned requests are intercepted. To this end, one of the threads associated with the requests (generated by the kernel component) is identified. Note operation 306. For reasons that will soon become apparent, a start address of code associated with the identified thread is obtained in operation 308.

It is then determined whether the start address is within the kernel component. Note decision 310. If it is determined that the start address is within the kernel component, an indication is thus provided that the kernel component is handling a particular request and, since the kernel component handles remote open file requests, the present request is determined to be a remote open file request.

Specifically, with reference now to FIG. 4, if it is determined that the start address is within the kernel component, the associated request is categorized as a request received via the network (i.e. a remote open file request, etc.). See operation 404. To this end, such request may be handled in a tailored manner.

Similarly, if it is determined that the start address is not within the kernel component, the associated request is categorized as a request received locally. Note operation 402. Again, such request may be handled in a tailored manner. More illustrative information regarding such tailored processing (see operation 406) will now be set forth.

Specifically, the remote requests received via the network may be handled with more scrutiny with respect to the requests received locally. For example, the requests received via the network may be handled utilizing a first process associated with the virus scanner. Moreover, the local requests received locally may be handled utilizing a second process associated with the virus scanner. Therefore, the requests may be handled based on the determination for tailoring the handling in accordance with the type of the requests.

In one specific exemplary embodiment, access to the file may be conditionally given based on the determination of request type. For example, access may be denied or given greater scrutiny in cases where the request is a remote request. Still yet, scanning may optionally be more intense (i.e. involve more virus signatures, etc.) where the request is a remote request.

Table 2 sets forth some various rules that may be incorporated, due to the ability to differentiate between local and remote requests. Additional information may be obtained on further rules by reference to the aforementioned related co-pending application, which is incorporated herein by reference.

TABLE 2

| | |
|---|---|
| On a workstation: | it is legitimate for 'windows update' to update executables. It is not legitimate for anyone on the network to update any executable. A rule is thus provided which "stops network users from changing any executable." |
| On a fileserver: | the comment above about 'windows update' is still true. However, it is okay for users on the network to change some executables (i.e. those in directories that are meant to be shared, etc.). However, it is still not legitimate for users to change executables which belong to the operating system. Rules are provided which enforce this (i.e. "stop network users from changing any executable in the directory <c:\windows> and in subdirectories"). |

Thus, in one specific exemplary embodiment, the present technology may employ the component of the kernel which receives file open requests from the network, interprets them, and opens the local file (i.e. "srv.sys"). Such kernel component creates and uses a pool of threads to process requests. A device driver of the virus scanner may intercept the file open requests and, at that time, know which thread issued the open request. Such driver obtains the address of the code that the thread started executing and, if this is within the driver 'srv.sys,' assigns the file open request to a process called 'System: Remote' instead of the normal 'System' process that would otherwise be used.

Thus, now that the distinction between local and remote open requests is known, not only can the per-process configuration feature use it but, just as important, the more powerful file access protection rules are capable of being employed.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by subnational groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by preventing the infection thereof with malware, which may potentially cause extreme financial harm.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A security method, comprising:
receiving a request to open a file on a local computer;
determining whether the request is a local request received from a local process operating on the local computer or a remote request received from a remote computer coupled to the local computer via a network, by identifying a thread associated with the request and determining whether a start address of code associated with the thread is within a kernel component; and
categorizing the request as a remote request received via the network or a local request received locally based on the determination;
wherein the remote request is handled with more scrutiny with respect to the local request by at least one of denying the remote request to open the file and utilizing more virus signatures during scanning.

2. The method as recited in claim 1, wherein the kernel component is a component of the local computer and handles the request if the request is received from the remote computer via a network, and the determination is carried out utilizing the kernel component.

3. The method as recited in claim 2, wherein the kernel component includes a srv.sys file.

4. The method as recited in claim 2, wherein the kernel component creates a plurality of threads to process a plurality of the requests received from a plurality of the remote computers via the network.

5. The method as recited in claim 1, wherein the thread associated with the request identified utilizing a virus scanner.

6. The method as recited in claim 1, wherein the request is handled based on the determination for tailoring the handling in accordance with the type of the request.

7. The method as recited in claim 1, wherein access to the file is conditionally given based on the determination.

8. The method as recited in claim 1, wherein the security method is utilized to counter terrorism by preventing infection of cyber-frameworks with malware initiated by terrorists.

9. The method as recited in claim 1, wherein the remote request is handled with more scrutiny by preventing the remote request from changing any executable while only preventing the local request from changing an executable associated with an operating system.

10. A security method, comprising:
receiving a request to open a file on a local computer;
determining whether the request is a local request received from a local process operating on the local computer or a remote request received from a remote computer coupled to the local computer via a network;
wherein the remote request is handled with more scrutiny with respect to the local request by at least one of denying the remote request to open the file and utilizing more virus signatures during scanning;
wherein a kernel component of the local computer handles the request if the request is received from the remote computer via a network, and the determination is carried out utilizing the kernel component;
wherein the kernel component creates a plurality of threads to process a plurality of the requests received from a plurality of the remote computers via the network;
wherein at least one of the threads associated with the requests is identified utilizing a virus scanner;
wherein the virus scanner obtains a start address of code associated with the identified thread.

11. The method as recited in claim 10, wherein the virus scanner determines whether the start address is within the kernel component.

12. The method as recited in claim 11, wherein, if it is determined that the start address is within the kernel component, the associated request is categorized as a request received via the network.

13. The method as recited in claim 12, wherein, if it is determined that the start address is not within the kernel component, the associated-request is categorized as a request received locally.

14. The method as recited in claim 13, wherein the requests received via the network are handled utilizing a first process associated with the virus scanner.

15. The method as recited in claim 14, wherein the requests received locally are handled utilizing a second process associated with the virus scanner.

16. A security computer program product embodied on a computer readable medium, comprising:
computer code for receiving a request to open a file on a local computer;
computer code for determining whether the request is a local request received from a local process operating on the local computer or a remote request received from a remote computer coupled to the local computer via a network, by identifying a thread associated with the request and determining whether a start address of code associated with the thread is within a kernel component;
computer code for categorizing the request as a remote request received via the network or a local request received locally based on the determination; and
computer code for scanning the file based on the determination for tailoring the scanning in accordance with the type of the request;
wherein the remote request is handled with more scrutiny with respect to the local request by at least one of denying the remote request to open the file and utilizing more virus signatures during scanning.

17. A security system, comprising:
means for receiving a request to open a file on a local computer;
means for determining whether the request is a local request received from a local process operating on the local computer or a remote request received from a remote computer coupled to the local computer via a network, by identifying a thread associated with the request and determining whether a start address of code associated with the thread is within a kernel component;
means for categorizing the request as a remote request received via the network or a local request received locally based on the determination; and
means for scanning the file based on the determination for tailoring the scanning in accordance with the type of the request;
wherein the remote request is handled with more scrutiny with respect to the local request by at least one of denying the remote request to open the file and utilizing more virus signatures during scanning.

18. A security system, comprising:
a virus scanner adapted for determining whether a request to open a file on a local computer is a local request received from a local process operating on the local computer or a remote request received from a remote computer coupled to the local computer via a network, by identifying a thread associated with the request and determining whether a start address of code associated with the thread is within a kernel component;
wherein the virus scanner is further adapted to categorize the request as a remote request received via the network or a local request received locally based on the determination;
wherein the file is scanned based on the determination for tailoring the scanning in accordance with the type of the request;
wherein the remote request is handled with more scrutiny with respect to the local request by at least one of denying the remote request to open the file and utilizing more virus signatures during scanning.

19. A security method, comprising:
receiving a plurality of requests to open files on a local computer, wherein the requests received via a network are handled by a kernel component which creates a plurality of threads to process the requests received from the network;
intercepting the requests, utilizing a virus scanner;
identifying one of the threads associated with one of the requests, utilizing the virus scanner;
obtaining a start address of code associated with the identified thread, utilizing the virus scanner;
determining whether the start address is within the kernel component;
if it is determined that the start address is within the kernel component, categorizing the associated request as a remote request received via the network;
if it is determined that the start address is not within the kernel component, categorizing the associated request as a local request received locally;
scanning the files based on the determination for tailoring the scanning in accordance with the type of the request;
wherein the remote request is handled with more scrutiny with respect to the local request by at least one of denying the remote request to open the files and utilizing more virus signatures during scanning.

* * * * *

UNITED STATES PATENT AND TRADEMARK OFFICE
CERTIFICATE OF CORRECTION

PATENT NO. : 7,415,727 B1 Page 1 of 1
APPLICATION NO. : 10/876523
DATED : August 19, 2008
INVENTOR(S) : Lowe et al.

It is certified that error appears in the above-identified patent and that said Letters Patent is hereby corrected as shown below:

col. 6, line 58 insert --is-- before "identified" and after "request".

Signed and Sealed this

Ninth Day of February, 2010

David J. Kappos
*Director of the United States Patent and Trademark Office*